United States Patent [19]

Tijburg et al.

[11] Patent Number: 4,962,280

[45] Date of Patent: Oct. 9, 1990

[54] CARRIER MATERIAL FOR A CATALYST AND A PROCESS FOR MAKING SUCH A CARRIER MATERIAL

[75] Inventors: Ivo I. M. Tijburg, Utrecht; John W. Geus, Bilthoven, both of Netherlands

[73] Assignee: Engelhard de Meern B. V., Strijkviertel, Netherlands

[21] Appl. No.: 305,158

[22] Filed: Feb. 1, 1989

[30] Foreign Application Priority Data

Feb. 2, 1988 [NL] Netherlands ............... 8800251

[51] Int. Cl.$^5$ .............................................. B01J 32/00
[52] U.S. Cl. ................................................... 502/439
[58] Field of Search ............... 502/303, 346, 439, 302, 502/304

[56] References Cited

U.S. PATENT DOCUMENTS

| | | | |
|---|---|---|---|
| 3,226,340 | 12/1965 | Stephens et al. | 252/465 |
| 3,899,444 | 8/1975 | Stephens | 502/303 X |
| 4,113,658 | 9/1978 | Geus | 252/454 |
| 4,331,565 | 5/1982 | Schaefer et al. | 252/462 |
| 4,426,319 | 1/1984 | Blanchard et al. | 502/241 |
| 4,585,632 | 4/1986 | Schneider et al. | 423/239 |
| 4,613,584 | 9/1986 | Schneider et al. | 502/304 |
| 4,722,920 | 2/1988 | Kimura et al. | 502/303 X |
| 4,808,564 | 2/1989 | Matsumoto et al. | 502/303 |

FOREIGN PATENT DOCUMENTS 2739466 9/1978 Fed. Rep. of Germany .
2905292 8/1979 Fed. Rep. of Germany .

OTHER PUBLICATIONS

"Specific Adsorption of Co(II) and [Co(III)ED-TA]-Complexes on Hydrous Oxide Surfaces", Huang and Lin, published in Adsorption from Aqueous Solution, Plenum Press, 1981, New York, pp. 61-91.

"Influence of Surface Area and Additives on the Thermal Stability of Transition Alumina Catalyst Supports I: Kinetic Data", P. Burtin et al, Applied Catalysis 34 (1987), 225-238, Elsevier Science Publishers B.V., Amsterdam.

"The Influence of Lanthanum Oxide on Nickel-/Alumina Methanation Catalysts", Schaper, Thesis 1984, Delft, pp. 73-75.

Primary Examiner—W. J. Shine
Attorney, Agent, or Firm—Weingarten, Schurgin, Gagnebin & Hayes

[57] ABSTRACT

This invention relates to a carrier material essentially consisting of aluminium oxide, possibly in combination with a different metal oxide, and to the surface of which a compound of a metal ion of the 3rd or 4th subgroup of the Periodic Table has been applied, so uniformly that, after a treatment at 1000° C. for 6 hours, the carrier material does not exhibit diffraction maximums in the X-ray diffraction pattern with a half-value width of less than 1.0 degree of arc (measured over the double diffraction angle). The invention also relates to a process for making the carrier material.

14 Claims, 2 Drawing Sheets

CARRIER MATERIAL FOR A CATALYST AND A PROCESS FOR MAKING SUCH A CARRIER MATERIAL

This invention relates to a carrier material essentially consisting of aluminium oxide, possibly in combination with a different metal oxide, and to the surface of which a compound of a metal ion has been applied, the metal of said compound being different from the metal of the metal oxide or oxides, and also to a process for making it.

In conducting chemical reactions, catalysts are often used. On the one hand, their object is to accelerate the establishment of the thermodynamic equilibrium of the reaction. On the other hand, the aim is that, of the reaction products which are thermodynamically possible, preferably one specific reaction product is formed in as high a yield as possible.

Generally speaking, a metal or metal compound is used as the catalytically active component, the starting point often being a compound of a metal ion with the metal in a higher valency than the catalytically active form. In such cases reduction is required after the application.

In a few cases, the catalytically active component is used as such, but mostly it is applied to a carrier material. The object of this is, on the one hand, to limit the amount of catalytically active material, and on the other, the carrier material may impart certain desirable properties to the catalyst. For example, a high-porosity thermostable carrier can be used, which prevents sintering of the catalytically active component or components during a thermal pretreatment of the catalyst or in use. Generally speaking, the aim will be for the surface of the carrier material proper to exhibit no catalytic activity, but so-called bifunctional catalysts are known, in which the activity of the carrier is also essential.

The manner in which the catalytically active material is applied to the carrier may affect the catalytic activity and the stability of the material. Generally speaking, the aim will be for both activity and selectivity to be as high as possible.

Carrier materials often used are metal oxides, in particular the various oxides of aluminium, silicon, magnesium, zirconium, titanium, zinc, and tantalum. For a good performance of such carrier materials, it is essential that, under the usual conditions where the catalyst is used, these are stable, i.e., that the surface structure and nature of the materials are not changed in an undesirable manner. This means, in the first place, that there must be no change, or a minor change only, in the crystal structure of the carrier material under the influence of high temperatures to which it may be subjected during the manufacture of the catalyst or in use. Secondly, there must be no undesirable chemical reaction between the carrier material and the catalytically active component, i.e., a metal or metal compound or a precursor thereof.

In Burtin et al., Influence of Surface Area and Additives on the Thermostability of Transition Alumina Catalyst Supports, I: Kinetic Data, Applied Catalysis, 34 (1987), pages 225-238, the influence of the surface area and of additives on the conversion of various transition aluminas into α-alumina is described with reference to some methods. The publication shows that the conversion into α-alumina is enhanced by a large specific surface area of the original aluminium oxide. The study has also shown that zirconium, calcium, thorium and lanthanum ions acted as inhibitors for the conversion into α-alumina. From this, it could be concluded that the addition of these metal ions can effect a thermal stabilization of the catalyst.

U.S.-A-No. 4 585 632 is concerned with catalysts comprising an alumina support to which an intermediate layer has been applied. This intermediate layer may, inter alia, comprise γ-aluminium oxide, a silicon dioxide or an aluminium silicate, optionally in combination with an oxide of lanthanum and/or a lanthanide.

U.S.-A-No. 4 613 584 mentions the incorporation of titanium in an aluminium oxide support by impregnation of the support with tetra-alkyl titanium compounds, followed by hydrolysis thereof.

The catalysts of U.S.-A-No. 4 585 632 and U.S.-A-No. 4 613 584 are said to have thermal stability; however, their chemical stability is insufficient.

U.S.-A-No. 4 426 319 concerns an exhaust gas catalyst consisting of a support to which various catalytically active materials have been applied. These materials do not have sufficient thermal and chemical stability.

U.S.-A-No. 4 331 565 is also concerned with exhaust gas catalysts. The catalysts according to that publication have an alumina base support to which a cerium oxide coating has been applied. These carrier materials do not possess sufficient chemical stability.

German patent application No. 27 39 466 describes a catalyst consisting of nickel and/or cobalt oxide, lanthanum and/or cerium oxide and aluminium oxide, which catalyst finds application in the preparation of methane-containing gases. The catalyst described in the publication is obtained by precipitating the various oxides, in combination or otherwise, from aqueous solutions of soluble metal salts. According to the specification, precipitating the salts in three stages is most preferred, because that leads to the best results. This means first preparing aluminium oxide by precipitating aluminium oxide from an aluminium nitrate solution, subsequently precipitating onto this aluminium oxide lanthanum oxide from a lanthanum nitrate solution, and finally precipitating nickel oxide onto the lanthanum and aluminium containing product by precipitation from a nickel nitrate solution. In this way, catalysts are obtained containing 60-90% by weight of nickel oxide, 5-30% by weight of aluminium oxide and 5-10% by weight of lanthanum oxide. The good performance of this catalyst is attributed to the specific production conditions.

German patent application No. 29 05 292 describes that aluminium oxide can be stabilized against conversion into α-$Al_2O_3$ by treating the material with a mixture of lanthanum oxide with silicon dioxide or tin oxide. The treatment is effected by impregnating the aluminium oxide with a solution or colloidal suspension of compounds of the metals in question, followed by drying and calcination. The examples show that, nevertheless, the surface area of the resulting carrier materials decreases considerably during calcination, although some stabilization has occurred.

Schaper, Thermostable Ni-alumina catalysts, Thesis, 1984, Delft, pages 73-75, mentions the addition of lanthanum oxide to nickel-alumina methanization catalysts. In his discussion of the literature, he mentions that various publications report the addition of lanthanum oxide to suppress sintering, carbon deposition and nickel aluminate formation.

A further examination of the various materials described as suitable stable carrier material, however, has revealed that, although the thermal stability has been substantially improved, in particular the stability against undesirable reactions of the carrier material with the catalytically active component or precursor therefor is insufficient.

An illustrative example of such an undesirable reaction is the reaction of nickel-oxide with alumina to form nickel aluminate. As nickel catalysts on alumina are mostly made in the form of a nickel oxide-on-alumina catalyst precursor, which is then subsequently reduced to nickel-on-alumina, it is of great importance that nickel aluminate is not formed or not substantially formed, because this product is extremely difficult to reduce. This catalyst is especially used in the methane-steam reformation, and metallic nickel is the active component. At the high reaction temperature, nickel aluminate may also be formed, which compound has a negligible activity.

Copper-based catalysts, too, are often applied to the carrier material in the form of an oxide, whereafter this oxide is reduced to metallic copper at elevated temperature. Under the reduction conditions, a reaction may also occur between aluminium oxide and copper(II) oxide to form copper aluminate.

Another example is the use of cobalt oxide as a catalyst for the oxidation of ammonia to nitrogen oxide for the production of nitric acid. This catalyst is cheaper than the platinum nets now used for the purpose, while the operating pressure of the process can be increased without materially reducing the service life of the catalyst, as is the case with platinum. To achieve a sufficient activity, the cobalt oxide must be applied to aluminium oxide. Here again, however, the cobalt oxide reacts with the aluminium oxide to form cobalt aluminate with a low activity.

It is also often observed that the presence of a catalytically active oxide accelerates the reaction of the aluminium oxide to α-aluminium oxide with a negligible surface area. When the carrier is not too heavily loaded with an oxidically active component, the conversion to α-aluminium oxide is often of a greater extent than the reaction to an aluminate.

For this reason all sorts of measures have been studied to prevent or reduce this reaction with the carrier and the recrystallization to α-$Al_2O_3$. One possibility is to start from a spinel, such as magnesium-aluminate spinel, as a carrier. However, the spinel is decomposed, whereby the nickel forms with magnesium oxide a stable mixed oxide, while the nickel also reacts with the aluminium oxide.

In the publication by Schaper, mentioned above, it is noted that the addition of lanthanum oxide suppresses the formation of nickel aluminate. Apart from the fact that this only relates to the formation of nickel aluminate, it has been found that, with the normal lanthanum oxide containing aluminium oxide carrier materials, this reaction is suppressed in a minor degree only.

It is accordingly an object of the present invention to provide a carrier material having an improved chemical stability.

It has surprisingly now been found that the homogeneous and uniform application to the surface of the carrier material of a small amount of ions of an element of subgroup III and IV of the Periodic Table greatly suppresses this unfavourable reaction of the active component, or a precursor thereof, with the carrier material. The homogeneous application of the ions referred to is essential. The reaction of the active component, or precursor therefor, with the carrier material proceeds rapidly where the metal oxide of the carrier material does not contain the stabilizing ions in the surface.

The invention is accordingly characterized in that a compound of a metal ion of the 3rd or 4th subgroup of the Periodic Table has been applied to the surface of the metal oxide or metal oxides so uniformly that, after a treatment at 1000° C. for 6 hours, the carrier material does not exhibit diffraction maximums in the X-ray diffraction pattern with a half-value width of less than 1.0 degree of arc (measured over the double diffraction angle).

In this connection the half-value width of a diffraction maximum means the width at half the height of the maximum, expressed in degrees of arc.

Figure 1:
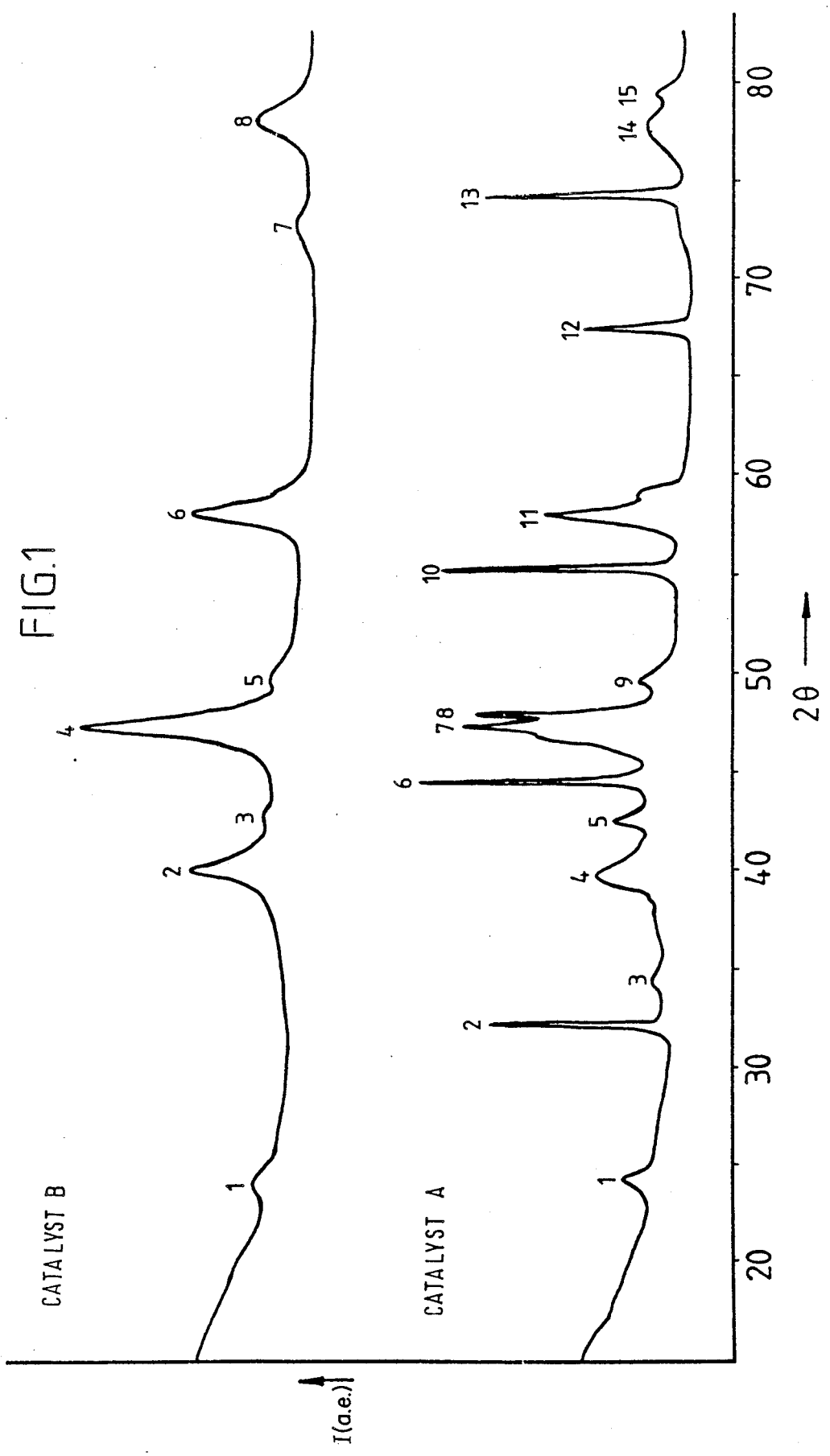
FIG. 1 shows X-ray diffraction patterns of a stabilized catalyst prepared on a carrier material of the prior art (catalyst A), and a stabilized catalyst prepared on a carrier material of the present invention (catalyst B)

Although the invention is not to be construed as being limited by any theoretical consideration, it may be assumed that as a result of the uniform application of the above-defined element in the form of an ion to the surface of the carrier material, the surface is surprisingly converted crystallographically so that it does not, or not substantially react with the catalytically active material or the precursor therefor any longer.

In this connection, "uniform application" means that, per unit area of the carrier material, for example, in each 100 $Å^2$, substantially equal amounts of metal ions of the 3rd or 4th group are present. In general it is not essential that a monolayer of stabilizing metal ions is present. Much fewer ions will suffice, provided they are uniformly distributed throughout the surface of the carrier material, and there should be a sufficient amount to prevent the crystallographic conversion of the total area into the undesirable crystal form.

The carrier material according to the invention has the surprising advantage that the catalytically active component can be applied to its surface in finely-divided form without the occurrence of disturbing reactions with the carrier material, while also, under the usual pre-treatment conditions to be used, such as for hydrogenation, and conditions of use, the catalytically active component remains in finely-divided form. It will be clear that this gives particularly great advantages, as the utility of a catalyst is determined not only by the initial situation, but also by its stability against ageing.

An alternative method of determining the stability of the carrier material against the formation of α-$Al_2O_3$ and the reaction of aluminium oxide with metal compounds is provided by electron microscopy (selective area electron diffraction). When, after a treatment as defined above, no α-$Al_2O_3$ or metal aluminate particles with dimensions in excess of 0.1 μm are found, the material is stable.

With the known carrier materials on the basis of aluminium oxide, it has hitherto not been possible to obtain sufficient thermal and chemical stability. As will also become apparent from the examples, the application of the process of the state of the art does not result in a uniform distribution of the stabilizing component. The diffraction pattern of the carrier material after the application of a catalytically active element, catalytically active compound or precursor therefor to the carrier material, followed by heat treatment for 24 hours at 1000° C. in an oxidizing gas, will not exhibit any distinguishable maxima of the metal aluminate that could be formed from the element, the metal compound, or precursor and $Al_2O_3$.

It is noted that, with the carrier materials according to this invention, it will often not be possible to identify the original carrier material and the stabilizing compound of metal ions of the 3rd or 4th subgroup as separate compounds. Much rather it will be a matter of an incorporation of the metal ions in the lattice of the metal oxide of the carrier material. The proportion of the ion of the element defined above can vary within wide limits, provided the distribution is uniform. Generally speaking, this proportion will be at least 0.1% by weight, calculated as oxide, more specifically range between 0.1 and 25% by weight, calculated on the carrier material. Proportions higher than 25% by weight have no advantages but do not have an adverse effect per se. As shown by the Periodic Table of Elements, as defined in IUPAC, Nomenclature of Inorganic Chemistry, 1970 (Definitive Rules 1970), London 1970, yttrium, zirconium, titanium, scandium, niobium, lanthanum, hafnium and tantalum are among the elements which can be used according to the invention, as well as the lanthanides and actinides. Lanthanum, the lanthanides and zirconium are preferred, because these elements give the best stabilization against undesirable reactions.

The basic component of the carrier material according to this invention is aluminium oxide in one or more of the existing crystal modifications thereof, possibly in combination with one or more other thermostable metal oxides. If a combination with other metal oxides is used, the $Al_2O_3$ content will be at least equally high as the content of such other metal oxides. Examples of such other metal oxides are $ZrO_2$, $MgO$, $ZnO$, $TiO_2$, $Ta_2O_5$ and $SiO_2$. The use of $Al_2O_3$ only is preferred.

The carrier material according to the invention may have any form that is desirable in the art, such as powder, mouldings such as rings, pellets, and the like, or extrudates.

The invention also relates to a process for making a carrier material for a catalyst, which process is characterized by uniformly applying a metal ion from the 3rd or 4th subgroup of the Periodic Table to a carrier material on the basis of a metal oxide. In one embodiment of the process, these metal ions are applied by adsorption of a complex of the metal ion in aqueous solution, preferably at a constant pH. This adsorption can be carried out at a pH of 4-10, with the degree of adsorption being partly determined by the choice of the pH. In this connection reference is made to the article by Huang and Lin, Specific Adsorption of Cobalt(II) and [CO(III)EDTA]$^-$ complexes on Hydrous Oxide Surfaces, published in Adsorption from Aqueous Solution, Plenum Press, 1981, New York, pages 61-91. The inventors are assuming that the mechanisms proposed in that publication for the adsorption of cobalt compounds also hold for the metal ions of the 3rd and 4th subgroup as used in the present invention.

As complexing agents, conventional complexing agents, known in the art, can be used, such as EDTA (ethylenediaminetetraacetic acid), EGTA (ethylene glycol bis($\gamma$-aminoethylether)-N,N,N',N'-tetraacetic acid), citrates, oxalates and the like.

The metals are preferably selected from the group consisting of lanthanum, the lanthanides, zirconium and titanium.

In this respect it is remarked that U.S.-A- No. 4 613 584 describes the use of organotitanium compounds. These compounds cannot be regarded as complexes. The use thereof does not lead to the advantages of the present invention, and anyway, the process to be used is rather unattractive. The process requires the use of large amounts of organic solvent or requires excessive precautions in case the organotitanium compound as such is used.

After the adsorption, which generally may take 0.5 min to 5 hours, the liquid is separated from the solid. This can be effected in known manner, such as by filtration, decantation and centrifugation. The moist carrier material is then generally dried to remove the liquid, and if necessary subjected to a thermal treatment to produce the desired oxide form. This thermal treatment is generally effected at a temperature of between 150° and 600° C. for a period of half an hour to 24 hours.

According to another embodiment of the process according to the invention, the compound of the metal ion from the 3rd or 4th subgroup of the Periodic Table is applied to the metal oxide carrier material by homogeneous deposition precipitation, as described in U.S. Pat. No. 4,113,658, which is incorporated herein by reference.

The further treatment of the carrier material after the homogeneous deposition precipitation can be effected as described in relation to the first embodiment of the invention.

As stated above, the proportion of the compound of the metal ion from the 3rd or 4th subgroup of the Periodic Table can be influenced by the choice of the pH, if one starts from adsorption of a complex. In the case of homogeneous deposition precipitation, the degree of loading can be determined by the amount of compound precipitated from the solution. Another possibility of varying the degree of loading consists in repeating the application one or more times. In this way very high degrees of loading can be achieved, although in general this will not be required according to this invention.

The carrier material according to the invention can advantageously be used for the preparation of all kinds of catalysts by applying catalytically active material thereto. Suitable catalytically active materials are, inter alia, those based on metals or compounds of metals, such as nickel, copper, cobalt, chromium, iron, manganese, platinum, palladium, rhodium and/or ruthenium.

The invention is illustrated in and by the following examples, without being limited thereto.

EXAMPLE 1

20 g $\gamma$-$Al_2O_3$ (Al 4172, 265 m$^2$/g, pore volume 1.14 ml/g - marketed by Harshaw) was suspended in 750 ml deionized water of 30° C. The pH was adjusted to 5 by means of concentrated $HNO_3$. 1.95 g EDTA (ethylenediamine tetraacetic acid) was dissolved in 50 ml deionized water by adding concentrated ammonia dropwise, taking care that the pH did not decrease below 4. 2.69 g.$La(NO_3)_3.6H_2O$ (corresponding to an ultimate load of 5% by weight of $La_2O_3$) was dissolved in 5 ml deionized water and carefully added to the EDTA solution. The pH wa kept between 4 and 7 by adding dilute ammonia. The ultimate solution was poured into the suspension of γ-Al$_2$O$_3$ in water. The pH was re-adjusted to 5 by adding dilute NHO$_3$. The suspension was vigorously stirred for one hour and the pH was kept constant by injecting dilute HNO$_3$ below the surface of the liquid. After one hour, the suspension was filtered and washed twice with 25 ml deionized water. The carrier material was subsequently dried at 60° C. for 16 hours. The dried carrier material was calcined in the air for 5½ hours at a temperature of 550° C. to convert the lanthanum complex into the oxidic form. The carrier material ultimately contained 3% by weight of La$_2$O$_3$. Of the amount of La(EDTA) originally added, 60% was adsorbed to the γ-Al$_2$O$_3$.

After heating at 1050° C. for 24 hours, no distinguishable lines of α-Al$_2$O$_3$ were detected in the RD pattern.

EXAMPLE 2

15 g of the stable carrier whose preparation was described in Example 1, was suspended in 750 ml deionized water of 30° C. 6.0 g Co(NO$_3$)$_2$.6H$_2$O was dissolved in 50 ml deionized water and added to the suspension. The suspension was vigorously stirred while the liquid was insufflated with nitrogen below its surface. The pH was adjusted to 4.8 using concentrated HNO$_3$. By injecting a 0.25 M NaOH solution (0.3 ml/min) below the surface of the liquid, the pH was increased to 12.5. After 16 hours, the catalyst was filtered and washed twice with 25 ml deionized water. The catalyst was dried at 60° C. for 23 hours. The ultimate product was a catalyst containing 10% Co$_3$O$_4$ on Al$_2$O$_3$. 0.6 g of this catalyst was placed in a quartz reactor. The temperature was increased to 1000° C., while nitrogen was passed over the catalyst (space velocity 3000 h$^{-1}$). The catalyst was kept at this temperature for 6 hours and then cooled to room temperature. It was found that there had been no cobalt aluminate formation during the treatment at the high temperature. This was confirmed by measuring the activity of the catalyst in the non-selective oxidation of methane. After the high-temperature treatment no deactivation was observed.

After heating the catalyst for 24 hours at 600o° in an oxidic gas, no metal aluminate was found in the RD spectrum.

EXAMPLE 3

9.5 g γ-Al$_2$O$_3$ (Al 4172 - marketed by Harshaw) was placed in a bulb flask secured to a rotation vaporizer. The rotation vaporizer was evacuated using a water jet pump to a pressure of 2×10$^3$ Pa. 1.95 g EDTA was dissolved in 15 ml deionized water by adding concentrated ammonia, taking care that the pH did not decrease below 4. 1.33 g La(NO$_3$)$_3$.6H$_2$O was dissolved in 5 ml deionized water and carefully added to the EDTA solution. The pH was kept between 4 and 7 by adding dilute ammonia. The total volume of the ultimate impregnation liquid was made up to 28 ml with deionized water. The impregnation liquid was injected into the γ-Al$_2$O$_3$ under vacuum. The impregnated carrier material was dried in vacuo at room temperature and subsequently calcined in the air at 550° C. for 5½ hours. The carrier material ultimately contained 5% by weight of La$_2$O$_3$. The carrier material was found to satisfy the stability requirement given in Example 1.

EXAMPLE 4 20 g pseudo-boehmite (Al 4170, 300 m$^2$/g, pore volume 0.84 ml/g), marketed by Harshaw, was suspended in 750 ml deionized water at 70° C. The pH was adjusted to 6 by means of concentrated HNO$_3$.

A solution of La(EDTA) was made by the method described in Example 1. This solution was added to the suspension of boehmite in water. The pH was re-adjusted to 6 by adding dilute HNO$_3$. The suspension was vigorously stirred for one hour, and the pH was kept constant by injecting dilute HNO$_3$ below the liquid surface. After one hour, the suspension was filtered and washed twice with 25 ml deionized water of 70° C. The carrier material was then dried at 60° C. for 44 hours. The dried carrier material was calcined in the air at a temperature of 550° C. for 5½ hours to convert the lanthanum complex into the oxidic form. As the iso-electric point of the carrier material depends on the temperature, it was expected that, at higher temperature, more La(EDTA) can be adsorbed to the surface. This proved to be the case. The total amount of adsorbed La(EDTA) was at 70° C. about 30% higher than at room temperature. This carrier material also satisfied the requirement of uniform distribution.

EXAMPLE 5

20 g γ-Al$_2$O$_3$ (Al 4172), marketed by Harshaw, was suspended in 750 ml deionized water of 30° C. The pH was adjusted to 5 by means of concentrated HNO$_3$. A solution of La(EDTA) was made by the method described in Example 1. This solution was poured into the suspension of γ-Al$_2$O$_3$ in water. The pH was re-adjusted to 5 by adding dilute HNO$_3$ dropwise. The suspension was vigorously stirred for one hour, and the pH was kept constant by injecting dilute HNO$_3$ below the surface of the liquid. After 1 hour, the suspension was filtered and washed twice with 25 ml deionized water. The carrier material was then dried at 60° C. for 16 hours. The dried carrier material was calcined in the air for 5½ hours at a temperature of 550° C. to convert the lanthanum complex into the oxidic form. 18.6 g of the carrier material thus prepared was suspended in 750 ml deionized water of 30° C. The same procedure for applying lanthanum to the carrier was again carried out under exactly the same conditions. In this way a carrier material was obtained with a higher load (5% by weight) of the active component La than the carrier material in Example 1, whereafter the La was uniformly distributed.

EXAMPLE 6

9.5 g γ-Al$_2$O$_3$ (Al 4172), marketed by Harshaw, was placed in a bulb flask which was secured to a rotation vaporizer. This rotation vaporizer was evacuated by means of a water jet pump to a pressure of 2×10$^3$ Pa. 1.18 g EGTA (ethylene glycol-bis (2-aminomethylether) tetraacetic acid) was dissolved in 10 ml deionized water by adding concentrated ammonia dropwise, taking care that the pH did not decrease below 4. 1.33 g La(NO$_3$)$_3$.6H$_2$O was dissolved in 5 ml deionized water and carefully added to the EGTA solution. The pH was kept between 4 and 7 by adding dilute ammonia dropwise. The total volume of the ultimate impregnation liquid was made up to 17 ml with deionized water. The impregnation liquid was injected, in vacuo into the γ-Al$_2$O$_3$. The impregnated carrier material was dried in vacuo at 60° C. and subsequently calcined in the air at 550° C. for 5½ hours. The carrier material ultimately contained 5% by weight of uniformly distributed La$_2$O$_3$.

EXAMPLE 7

19 g γ-Al$_2$O$_3$ (Al 4172), marketed by Harshaw, was suspended in 750 ml deionized water of 30° C. The pH was adjusted to 4.4 by means of concentrated HNO$_3$. 2.69 g La(NO$_3$)$_3$.6H$_2$O was dissolved in 15 ml deionized water and added to the suspension. A 1 M NaOH solution was injected below the surface of the liquid at a rate of 7.4 ml/hours. The precipitation was terminated at a pH of 10. The suspension was filtered and washed twice with deionized water. It was dried at 60° C. for 16 hours. The dry carrier material was calcined in the air at 550° C. for 5½ hours. The load was 5% by weight of uniformly distributed La$_2$O$_3$.

EXAMPLE 8

A carrier material was prepared starting from pseudoboehmite by the method described in Example 1. By carrying out the preparation at pH 7, an ultimate load of 0.5% by weight of La$_2$O$_3$ was realized. Onto this carrier material, 10% by weight of Co$_3$O$_4$ was precipitated by the method of Example 2. The catalyst was tested by the same procedure as described in Example 2. Again, no deactivation was observed. Accordingly, it is possible for the stability of the catalyst to be enhanced by applying a proportion as low as 0.5% by weight of La$_2$O$_3$ uniformly to the surface of the carrier material.

COMPARATIVE EXAMPLE AND EXAMPLE 9

A stabilized carrier was prepared in accordance with the state of the art as described in the Thesis by Schaper (page 41) by impregnating 20 g γ-Al$_2$O$_3$ with a lanthanum nitrate solution, so that the ultimate carrier contains 0.5% by weight of La$_2$O$_3$. The carrier was dried overnight at 60° C. and subsequently calcined at 500° C. for 2 hours. This carrier material was subsequently impregnated with a copper nitrate solution so that, after drying and calcination, a catalyst was obtained which contained 10% by weight of CuO on Al$_2$O$_3$ (catalyst A, comparative).

In accordance with the method of Example 1, a carrier was prepared which after drying and calcination contained 0.5% by weight of La$_2$O$_3$. Onto this carrier, 10% by weight of CuO was deposited by means of homogeneous deposition precipitation (catalyst B, Example 9).

Both catalysts were subsequently heated at 1000° C. for 6 hours. The catalysts were characterized by means of X-ray diffraction and electron diffraction. In the X-ray diffraction pattern of catalyst A (FIG. 1) strong peaks of α-Al$_2$O$_3$ were visibe in addition to those of θ-Al$_2$O$_3$. In the X-ray diffraction pattern of catalyst B (FIG. 1), peaks of θ-Al$_2$O$_3$ were visible only.

The electron diffraction pattern of catalyst A showed, in addition to peaks of θ-Al$_2$O$_3$ also peaks of α-Al$_2$O$_3$ and Cu-Al$_2$O$_4$ (copper aluminate). The electron diffraction pattern of catalyst B only showed peaks of θ-Al$_2$O$_3$.

The above shows that catalyst A is only thermally stabilized, whereas catalyst B is also stabilized against the reaction of the active component with the carrier material.

Figure 2:
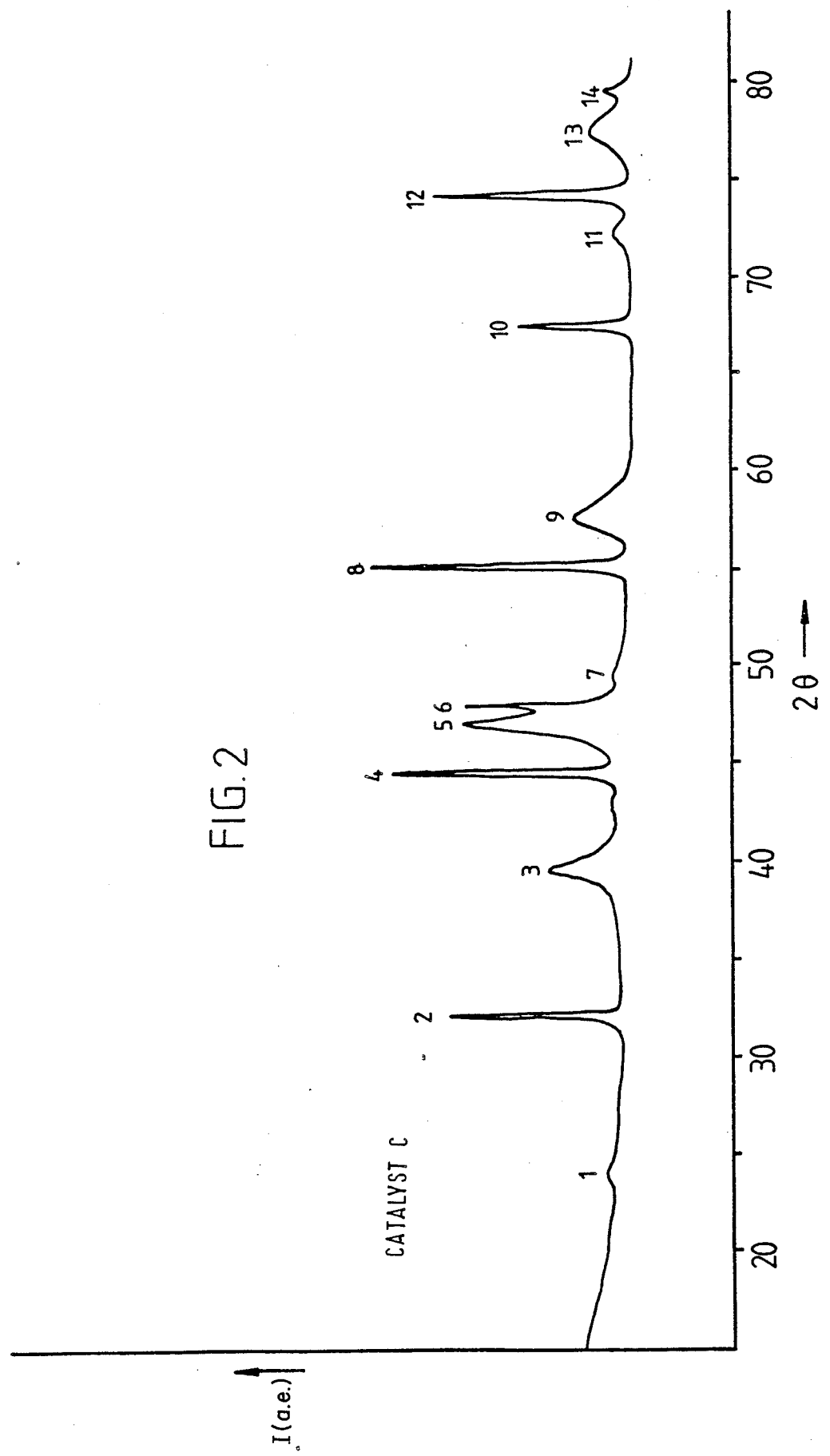
FIG. 2 shows an X-ray diffraction pattern of a non-stabilized catalyst prepared by depositing catalytically active material on γ alumina directly.

Starting from γ-Al$_2$O$_3$, a non-stabilized catalyst was prepared by homogeneous deposition precipitation of copper nitrate, followed by calcination as described for catalyst B. From this non-stabilized catalyst (C), the X-ray diffraction pattern was determined (FIG. 2). The identification of the peaks is given in the following table.

TABLE

| Peak | Catalyst A | Catalyst B | Catalyst C |
|------|------------|------------|------------|
| 1 | θ-Al$_2$O$_3$ | θ-Al$_2$O$_3$ | θ-Al$_2$O$_3$ |
| 2 | α-Al$_2$O$_3$ | θ-Al$_2$O$_3$ | α-Al$_2$O$_3$ |
| 3 | — | — | θ-Al$_2$O$_3$ |
| 4 | θ-Al$_2$O$_3$ | θ-Al$_2$O$_3$ | α-Al$_2$O$_3$ |
| 5 | — | — | θ-Al$_2$O$_3$ |
| 6 | α-Al$_2$O$_3$ | θ-Al$_2$O$_3$ | α-Al$_2$O$_3$ |
| 7 | θ-Al$_2$O$_3$ | θ-Al$_2$O$_3$ | θ-Al$_2$O$_3$ |
| 8 | α-Al$_2$O$_3$ | θ-Al$_2$O$_3$ | α-Al$_2$O$_3$ |
| 9 | θ-Al$_2$O$_3$ | — | θ-Al$_2$O$_3$ |
| 10 | αAl$_2$O$_3$ | — | α-Al$_2$O$_3$ |
| 11 | θ-Al$_2$O$_3$ | — | θ-Al$_2$O$_3$ |
| 12 | α-Al$_2$O$_3$ | — | α-Al$_2$O$_3$ |
| 13 | α-Al$_2$O$_3$ | — | θ-Al$_2$O$_3$ |
| 14 | θ-Al$_2$O$_3$ | — | α-Al$_2$O$_3$ |
| 15 | α-Al$_2$O$_3$ | — | — |

We claim:

1. A carrier material containing a substrate essentially consisting of aluminium oxide, possibly in combination with a different metal oxide; and a compound of a metal ion different from the metal of the substrate metal oxide or oxides and located on the surface of said substrate; said carrier material being characterized in that the metal of said compound of a metal ion is of the 3rd or 4th subgroup of the Periodic Table and is so uniformly distributed that, after a treatment at 1000° C. for 6 hours, the carrier material does not exhibit diffraction maximums in the X-ray diffraction pattern with a half-value width of less than 1.0 degree of arc (measured over the double diffraction angle).

2. A carrier material as claimed in claim 1, wherein the diffraction pattern of the carrier material, after the application of a catalytically active element, catalytically active compound, or precursor therefor, to the carrier material, followed by heat treatment for 24 hours at 1000° C. in an oxidizing gas, does not exhibit distinguishable maxima of metal aluminate that could be formed from catalytically active element, the catalytically active compound, or precursor therefore, and Al$_2$O$_3$.

3. A carrier material according to claim 2, wherein the diffraction pattern of the carrier material does not show distinguishable maxima of copper aluminate, when copper or a copper compound has been applied to the carrier material, followed by heating for 24 hours at 1000° C. in an oxidizing gas.

4. A carrier material as claimed in claim 1, wherein said substrate is Al$_2$O$_3$.

5. A carrier material as claimed in claim 1, wherein at least 0.1% by weight of the compound of the metal ion of the 3rd or 4the subgroup of the Periodic Table, calculated as metal oxide, is present.

6. A carrier material as claimed in claim 1, wherein no more than 25% by weight of the compound of the metal ion of the 3rd or 4th subgroup of the Periodic Table, calculated as oxide, is present.

7. A carrier material as claimed in claim 1, wherein the metal of the 3rd or 4the subgroup of the Periodic Table is selected from the group consisting of La, a lanthanide, Zr, and combinations thereof.

8. A process for making a carrier material, comprising the following steps: uniformly applying to the surface of aluminium oxide, possibly in combination with a different metal oxide, a compound of a metal ion of the 3rd or 4th subgroup of the Period Table of Elements in such a manner that, after treatment at 1000° C. for 6 hours, the carrier material exhibits no diffraction maximums in the X-ray diffraction pattern with a half-value width of less than 1.0 degrees of arc (measured over the double diffraction angle).

9. A process as claimed in claim 8, wherein the compound is uniformly applied in such a manner that the diffraction pattern of the carrier material, after a catalytically active element, catalytically active compound or precursor therefor has been applied to the carrier material, followed by heat treatment for 24 hours at 1000° C. in an oxidizing gas, does not exhibit distinguishable lines of metal aluminate that could be formed from the catalytically active element, the catalytically active compound or precursor therefor, and $Al_2O_3$.

10. A process as claimed in claim 8, wherein said step of uniformly applying further comprises the steps of adsorbing to the carrier material a complex of the metal ion with an organic complexing agent; drying the carrier materials; and calcining it.

11. A process as claimed in claim 10, characterized by using EDTA (ethylene diamine tetraacetic acid), EGTA (ethylene glycol bis($\ominus$-aminoethylether)-N,N,N',N'-tetraacetic acid, citrate or oxalate complexes.

12. A process as claimed in claim 8, wherein said step of uniformly applying comprises the step of applying said compound by homogeneous deposition precipitation.

13. A process as claimed in claim 8, wherein said step of uniformly applying comprises the steps of repeating the application of the compound of the metal ion one or more times.

14. A process as claimed in claim 10, wherein in said absorbing step the metal ion is selected from the group consisting of lanthanum, a lanthanide, zirconium, and titanium.

* * * * *